United States Patent [19]

Garneau et al.

[11] Patent Number: 5,675,647
[45] Date of Patent: Oct. 7, 1997

[54] CABLE TV SYSTEM USING PASSWORDS

[75] Inventors: Pierre Garneau, Montreal; Josée Corriveau, St-Léonard; Michel Dufresne, Bouchorville, all of Canada

[73] Assignee: Le Groupe Videotron Ltee, Montreal, Canada

[21] Appl. No.: 569,602

[22] Filed: Dec. 8, 1995

Related U.S. Application Data

[62] Division of Ser. No. 193,410, Feb. 7, 1994, Pat. No. 5,497,420.

[51] Int. Cl.⁶ ................................................ H04L 9/00
[52] U.S. Cl. ................................ 380/20; 358/86
[58] Field of Search ........................ 380/10, 15, 20; 370/94.1; 358/86

[56] References Cited

U.S. PATENT DOCUMENTS

| | | | |
|---|---|---|---|
| 4,710,955 | 12/1987 | Kauffman | 380/10 |
| 4,742,513 | 5/1988 | Reichard, Jr. et al. | 370/94.1 |
| 4,755,872 | 7/1988 | Bestler et al. | 358/86 |
| 4,893,248 | 1/1990 | Pitts et al. | 380/20 |
| 5,412,720 | 5/1995 | Hoarty | 380/15 |
| 5,440,632 | 8/1995 | Bacon et al. | 380/20 |
| 5,497,420 | 3/1996 | Garneau et al. | 380/20 |

Primary Examiner—Salvatore Cangialosi
Attorney, Agent, or Firm—Pascal & Associates

[57] ABSTRACT

This invention relates to a method of distributing signals to valid subscribers comprised of storing subscriber terminal valid identification codes at a central station, broadcasting promotions of services available to subscribers, each associated with a specific promotion code, selecting one of the services and entering a selected service promotion code into a terminal at a subscriber location, automatically reading an identification number associated with the terminal in response to the entering of a selected promotion code, processing the identification number and the selected promotion code in accordance with an encryption algorithm, and generating an encrypted event request code therefrom, providing the event request code to a verification center, at the verification center, decrypting the event request code, verifying the number against the valid identification codes, and providing a password unique to the terminal and the selected promotion code, entering the password into the terminal at the subscriber location, and providing access to a service utilizing one of the distributed signals corresponding to the selected promotion code to the subscriber in response to the entering of the password.

16 Claims, 3 Drawing Sheets

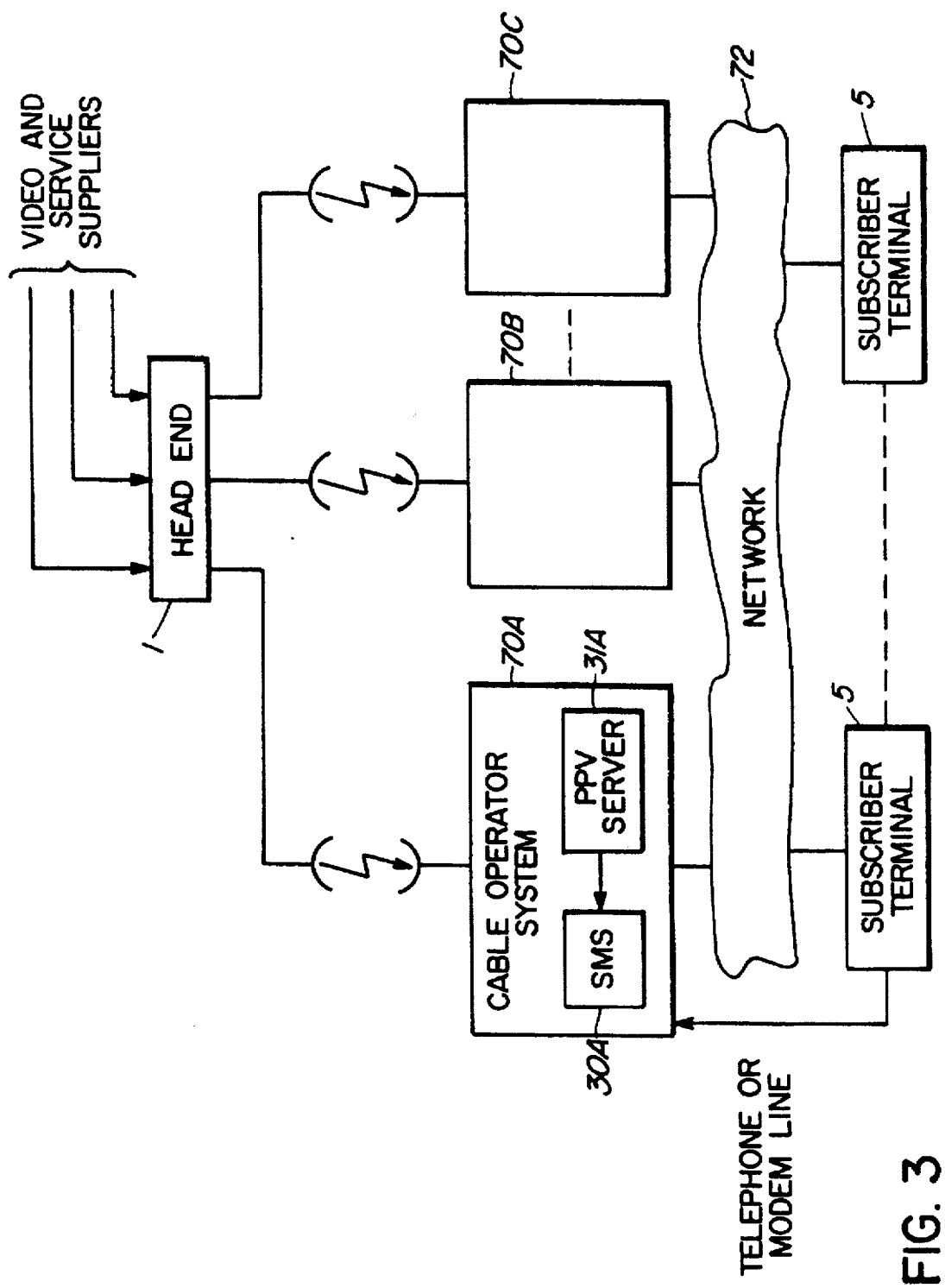

CABLE TV SYSTEM USING PASSWORDS

This is a divisional of application Ser. No. 08/193,410, filed Feb. 7, 1994 now U.S. Pat. No. 5,497,420.

FIELD OF THE INVENTION

This invention relates to a method and system for distributing signals to valid subscribers, which is usefully employed in a television pay per view system.

BACKGROUND TO THE INVENTION

Pay TV systems generally fall into one of two categories, in which either subscribers pay a monthly fee to view all signals transmitted on certain channels during a certain time period, or subscribers "pay per view" in which selected programs may be viewed by certain subscribers who pay a fee for each requested program. In the first category, filters may be removed from the transmission lines of authorized subscribers, or a descrambling signal may be downloaded from a head end to decoders in subscribers' terminals. In the second category, decoding signals restricted to particular programs are transmitted either via a telephone line or via the cable network to addressable decoders.

It is very expensive to send a serviceman to remove or to add filters locally at each subscriber location in a large population each time subscribers sign on or cancel service, or neglect to pay for the service. Further, the requirement to address each subscriber terminal by individual address in order to provide a descrambling code for specific programs or for specific time periods has been found to be a less than desirable system, since it utilizes scarce bandwidth and it is slow since it requires downloading of codes over a long period of time.

Further, such systems have not been capable of being used with common cable TV networks used by multiple cable TV companies, since a subscriber to one cable TV company could telephone another and obtain a download of a descrambling code thus receiving signals to which the subscriber is not entitled, thus depriving the first cable company of revenue from that subscriber.

Moreover, because of the relatively poor security, such systems are not feasible for use to provide other than cable TV services, for example banking services, personal service or merchandise ordering services, etc., in which information as to accounts, account statements, etc. would be desired to be displayed on the television display of the subscriber.

SUMMARY OF THE INVENTION

The present invention provides pay per view or the equivalent service which does not require the downloading of a descrambling or subscriber terminal enabling code from a head end on a terminal by terminal basis, and can be used to allow service providers to provide services such as banking, merchandise ordering, personal information storage and retrieval, etc. to a population of subscribers. In addition, the system can facilitate the use of a single network by multiple cable TV operators without the danger that a subscriber of one can order programming or services from another.

In addition, the system is not necessarily linked to a cable network distribution system, but can be used to control the provision of useful signals to subscribers distributed by domestic "on air" broadcasters, satellite broadcasts, etc.

The system is also suitable to be used to "narrow cast" e.g. to allow specifically authorized subscribers to select data or to receive data, and to translate that data via facsimile machine equipped to receive the signals into reports, messages, newspapers, bank statements and confirmation slips, etc. without there being need for the head end to transmit specific enabling or descrambling codes to specifically addressed terminals.

Each terminal can be individually enabled to receive a specifically requested sequence of signals (designating a program, service, etc.) by the subscriber inputting a password to the terminal. That password is obtained from a central station which has verified an event request code which is input, typically by touch tone telephone, and which provides the password by a synthetic voice response system. The event request code is provided on the television screen of the subscriber, after the subscriber has input to the terminal a request for a specific program or service.

In a pay per view system, for example, a barker channel displays the available programs and services, each coupled with a number. When a particular program or service is desired, the corresponding number is input to a subscriber terminal by the subscriber. The terminal in the meantime has stored the identification codes of the various programs and services in a memory, and checks the number input by the subscriber against the stored numbers, in order to verify that an input error has not been made.

The terminal then retrieves a unique logical or physical terminal address (I.D.) which can be stored in ROM, DIP switches or the like, retrieves the program or service identification code corresponding to the selected program or service, and utilizing an encryption key, processes the program number and terminal ID through an algorithm using the encryption key to form an encrypted event request code, which is displayed on the television screen. In a successful embodiment of the invention that code was 14 digits long, including an arithmetic check number, although other code lengths could be used, depending on the needs of the cable company. The subscriber then initiates the action of placing an order for a pay-per-view event. Automatic number identification (ANI) may be used if desired, which allows reduction in the number of digits used.

To place the order, the event request code that is displayed to the subscriber on the television screen is provided by the subscriber by telephone to the central station. The central station decrypts the code, checks the terminal number against the list of valid subscriber terminal numbers, checks the program code and provides the aforenoted password, e.g. by a synthetically generated voiced response to the subscriber. The subscriber then inputs the password to the terminal, which password provides to the terminal not only a descrambling code specific to the requested event, program, service, etc., but also authorizes the terminal to descramble, during a certain program interval, during which the descrambling code is to be invoked, and also preferably commands to the terminal to automatically switch the output to the television display to the required channel, which may be the barker channel, at a specific time, and for a specific interval, whereby the program is automatically provided to the subscriber.

Once the password is provided to the subscriber, the order for the pay-per-view event is accepted and billed. The subscriber has the option to cancel the order up until the start of the event. The process of cancellation is similar to that of requesting the event. The selected programs are listed on the television screen when you select the "cancel" option in the barker menu. You can select the program to cancel and once done, a 14 digit cancel code is displayed, and the program is immediately cancelled in the terminal. The 14 digit code should be given to the head end to cancel the bill before the program starts. After obtaining an encrypted cancel code on the television screen, the subscriber transmits it to the central station, using a different telephone number from the one used to place the order. A different password is given to the subscriber to input to the terminal to complete the cancel transaction.

It is known that it is virtually impossible to decrypt an encrypted code generated using modern encryption techniques within a reasonable time, which provides substantial security. Furthermore the encryption keys stored at the various terminals can be changed from time to time by broadcasting from a head end to terminals each addressed by the permanent address of the terminal, e.g. every two months. Since for this case each terminal need not be addressed immediately prior to a selected program or service, the saving of the required transmission equipment, bandwidth during peak times, etc., is evident.

Further, since the codes associated with various programs can be selected by the cable TV service provider, and are typically not provided on the barker channels until hours or only a day or two prior to transmission of a pay per view program, and both the encrypted code and password depend not only on the encryption key but also on the program number, it is virtually impossible to generate appropriate passwords by pirates in time to be able to descramble and fraudulently use the distributed pay per view signals.

It should be noted that the encryption key can be different for each of several cable TV operators which distribute signals on the same cable TV network or other media. Thus a subscriber terminal having stored a particular encryption key associated with the cable TV operator with which the subscriber has subscribed, will generate event request codes which are not recognized by the central station equipment of another of the cable TV operators, and either no passwords or no valid passwords will be generated upon request by a subscriber of another cable TV operator. This provides segregation of subscribers to separate cable TV operators all of which are connected to a single network. Thus a facility is provided in which an entire region can be connected in a single network or to a grouping of single networks, large or small. Yet there is no monopoly of the subscribers to one operator, and subscribers can choose whichever cable TV operator they wish. Plural cable TV operators serving an overlapping population need not duplicate a cable TV network, thus saving a considerable cost.

In accordance with an embodiment of the invention, a method of distributing signals to valid subscribers is comprised of storing at least one subscriber terminal valid identification code at a central station, broadcasting promotions of services available to subscribers, each associated with a specific promotion code, selecting one of said services and entering a selected service promotion code into a terminal at a subscriber location, automatically reading an identification number associated with the terminal in response to the entering of a selected promotion code, processing the identification number and the selected promotion code in accordance with an encryption algorithm, and generating an encrypted event request code therefrom, providing the event request code to a verification center, at the verification center, decrypting the event request code, verifying the number against the valid identification codes, and providing a password unique to the terminal and the selected promotion code, entering the password into the terminal at the subscriber location, and providing access to a service utilizing one of the distributed signals corresponding to the selected promotion code to the subscriber in response to the entering of the password.

In accordance with another embodiment, a method of distributing signals to valid subscribers is comprised of, at a subscriber terminal, generating a request code for a service utilizing the signals by accessing a stored program code relating to the service and an address code relating to an identification of the terminal, and encrypting the codes using an encryption key to generate a service request code, requesting the service from a central terminal by providing the service request code, at the central terminal decrypting the service request code and checking the validity of the address code and of the program code, and generating a password, entering the password at the subscriber terminal, and in response providing access to signals providing the service.

In accordance with another embodiment, a cable TV system is comprised of subscriber terminals, each subscriber terminal including apparatus for storing a terminal identification code, apparatus for storing a program identification code, apparatus for storing an encryption key, apparatus for processing the codes and the key according to an encryption algorithm and generating a program request code thereby, a display for displaying programs and for displaying the program request code, apparatus for receiving a password and in response, enabling a program to be passed to the display for display thereon, a head end, and a CATV network connected thereto, for transmitting a scrambled representation of the program to the subscriber terminals, a central station comprising apparatus for receiving the program request code, apparatus for decrypting the program request code, and determining the program identification code and the terminal identification code therefrom, apparatus for verifying validity of the determined program and terminal identification codes, and apparatus for generating the password in response to verification of the validity of the determined program and terminal identification codes.

In accordance with another embodiment, a cable TV system is comprised of a cable TV distribution network, a plurality of cable TV broadcaster equipments adapted to transmit programming via the network destined for subscriber terminals authorized to receive only from individual broadcaster equipments, a plurality of subscriber terminals connected to the network, each subscriber terminal including an encryption code, each code being unique to a particular broadcaster, apparatus at each the terminal for selecting a program, and for obtaining an encrypted event request code derived from the encryption key, apparatus at the equipments for generating a password which is unique to an event and is unique to an individual particular broadcaster, apparatus for applying the password to a terminal at which a program has been selected, for controlling display of a selected program at the terminal at which the program has been selected, whereby programs broadcast by other broadcasters are inhibited from being displayed at other terminals.

In accordance with another embodiment, a cable TV system is comprised of a network, subscriber terminals connected to the network authorized to receive signals offered by specific ones of different operators, and apparatus for restricting receipt by the subscribers of the signals to those offered by the specific ones of the operators for which the subscriber terminals have been authorized.

In accordance with another embodiment, a method of distributing signals to various subscribers is comprised of connecting plural subscribers to a single program distribution network for receiving programs therefrom, connecting plural program suppliers to said network, downloading to each of various subscriber terminals a code related to a particular program supplier, and storing said code at relates subscriber terminals, transmitting programs from said program suppliers to the network in particular separate channels, and enabling the receipt of particular programs only from related program suppliers by specific subscriber terminals using said codes.

BRIEF INTRODUCTION TO THE DRAWINGS

A better understanding of the invention will be obtained by reference to the detailed description below, in conjunction with the following drawings, in which:

FIG. 1A is a block diagram of an alternate form of checking system,

FIG. 1B is a block diagram of another alternate form of checking system,

FIG. 3 is a block diagram of a multi-operator program broadcast system.

DETAILED DESCRIPTION OF THE INVENTION

Figure 1:
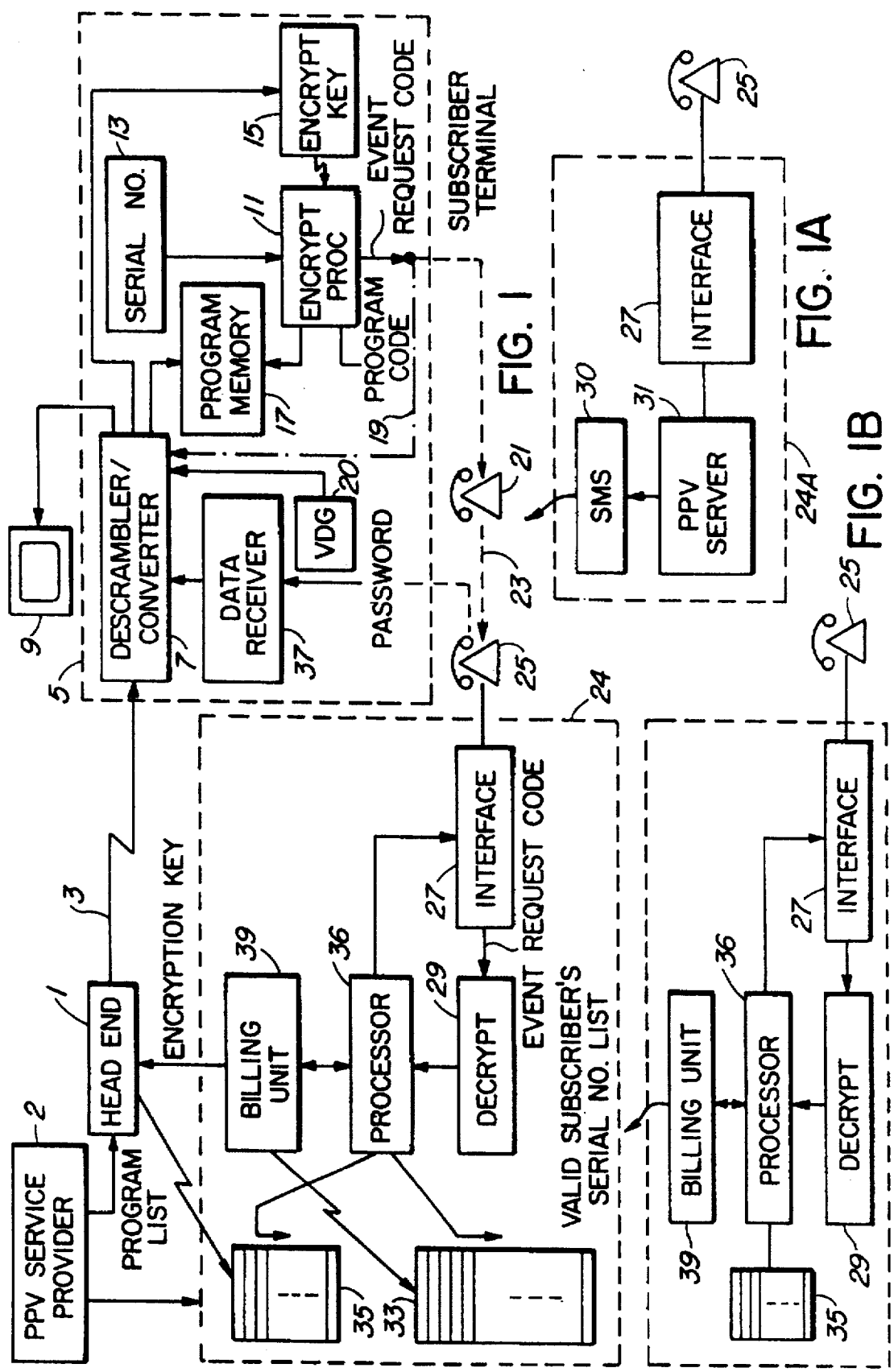
FIG. 1 is a block diagram of a system used to implement the invention.

FIG. 1 illustrates a block diagram example of a system for implementing the invention. It will be recognized that structural portions of a television distribution system which do not bear on the invention are not shown, as they are deemed to be known by persons skilled in the art.

A head end 1 generates program signals such as CATV signals and transmits them via a medium 3. In accordance with a successful prototype of the invention and in accordance with a preferred embodiment of the invention, the medium 3 is a cable TV distribution network. However it will be understood that the head end could transmit via a satellite distribution system, normal local broadcasting, a wide area network such as an optical fiber network (information highway), etc. Signals transmitted by the head end can be commercially supported, freely distributed signals, scrambled television signals, or other signals which provide various services to the various subscribers. The description below is mainly concerned with freely distributed signals, but only those that have been scrambled. Therefore subscriber terminal elements which bypass the descrambler/converter or which provide signals to a e.g. a facsimile port, to a computer input, etc. will not be shown. However those construction aspects of a terminal are known to persons skilled in the art, for example from U.S. Pat. No. 4,623,920 issued Nov. 18th, 1986, invented by Michel Dufresne et al.

Signals transmitted from the head end are received by subscriber terminal 5, and are fed to the input of descrambler/converter 7. Unless a descramble code has been received by the descrambler/converter, the signals are blocked from being passed through the descrambler/converter and thus from being shown understandably on a video monitor 9 which is connected to its output.

In operation, the head end 1 transmits unscrambled on a barker channel a display of promotions of services available to subscribers, each associated with an associated promotion code. The services can include or be comprised of scrambled TV programs as might be desired to be viewed in a pay per view scheme. The list is compiled from a pay per view service provider 2.

At an appropriate time the programs to be selected are also transmitted in other channels; for example there may be two different pay per view auxiliary channels, scrambled, which are transmitted from the head end at predetermined times.

The barker channel is not scrambled and either bypasses the descrambler/converter or passes through the descrambler/converter without the requirement to be descrambled, and are displayed on video monitor 9. The subscriber views the barker channel, and selects a program service, identified by a program code.

The subscriber then inputs the program code into the subscriber terminal e.g. by means of a remote control which is passed into an encryption processor 11.

A terminal address module 13 is associated with subscriber terminal 5, and could be a group of dip switches which logically identify the subscriber terminal, or a logical address stored in a read only memory (ROM), or an address in firmware, or an address permanently stored in some other manner.

The subscriber terminal 5 also contains a memory 15 which stores an encryption key.

Upon the subscriber entering the program code to the subscriber terminal 5 for a specifically desired service such as a pay per view program, the encryption algorithm accesses the terminal identifying serial number from module 13, the encryption key from memory 15, and utilizing the program code, processes the aforenoted data in accordance with the encryption algorithm, generating an encrypted event request code. In a successful embodiment of the invention, the event request code was 14 digits long, and will be described in more detail below.

It is also preferred that the program number signals of the services that are promoted on the barker channel should be stored in a program memory 17, which is connected to receive those signals from descrambler/converter 7. Prior to the processor 11 generating the event request code, it is preferred that it should access the program memory and compare stored program numbers with the program code input by the subscriber. If it fails to detect the input program code, clearly the subscriber has made an error in entry, and processor 11 can send a signal via path 19 to descrambler/converter 7 to display a message on video monitor 9, advising the subscriber that an erroneous program code has been entered.

Assuming that the program code has been verified as correct, the event request code generated by processor 11 is passed via signal path 19 to descrambler/converter 7 for display to the subscriber on video monitor 9, with an appropriate message generated by a video display generator 20 connected to the descrambler/converter, such as advising the subscriber to telephone the displayed event request code to a predetermined telephone number.

The subscriber then uses his telephone 21 and dials a central station which contains a checking system 24 as will be described, keying the encrypted event request code by touchtone (or equivalent) and transmitting it via telephone line 23 to a telephone set 25, modem, or equivalent at the central station 24.

It should be noted that rather than the subscriber dialing his telephone, the terminal 5 could include a modem, and upon inputting a command to subscriber terminal 5, the modem could be enabled to automatically dial a corresponding modem at the central station. Therefore for that embodiment, telephone sets 21 and 25 should be replaced with modems which automatically communicate with each other.

In accordance with a successful embodiment, the 14 digit code was in the general format: AAAAAAEEECBBBV, in which AAAAAA is a field of 6 decimal numbers taken from the terminal address of the subscriber terminal, and is an unique identification of the subscriber terminal from which an event is ordered and to which a program or service is to be delivered.

EEE is a field that contains the number of the service or pay per view event ordered by the subscriber. A different event number is assigned to each event and each date and time the event is provided. For example, on odd numbered months the event number was designated to range from 001 to 399 for movies, and from 400 to 499 for special events. On even numbered months the event number was designated to range from 501 to 899 for movies, and from 900 to 999 for special events.

The C field contained the event logical channel number on which the event was to be broadcast. The possible values were in the interval 0–9. In a small system using the above format, for example, 0 can be a publicity channel (called a barker channel), 1 can be a first pay per view channel and 2 can be a second pay per view channel. Logical channels are translated by the descrambler/converter to specific channels; for example, if logical channel 1 was selected and was enabled to be decoded, channel 56 could be designated as the first pay per view channel, which can be decoded and shown on channel 14, a representative barker channel.

BBB was a billing code generated by a subscriber terminal. The billing code also serves to prove to the central terminal that the subscriber used his or her own subscriber terminal to generate the code. The BBB billing code was created using the encryption key located in a read only memory (ROM) in the subscriber terminal.

V was a validation code calculated from the preceding 13 numbers, and serves to indicate to the central terminal that the user has not made any errors entering the data for the event.

Returning now to FIG. 1, when the event request code has been received by telephone 25 or equivalent modem, it is detected in interface 27 of checking system 24. This is where the event request code entered by the subscriber is validated by rebuilding the validation code V in conjunction with description system 29. If proven invalid, a feedback message is sent to the subscriber, to retry his entry, which could be a synthesized voice message if telephones are used, or a message for display on the TV screen of the subscriber if a modem is used.

In one embodiment of checking system 24, a table 33 has stored in it a list of all valid subscriber serial numbers, and a table 35 has stored in it a valid program list. Processor 36 reads table 33 and determines whether a valid terminal address has been entered. It also checks table 35 to ensure that a valid program number has been entered.

In another embodiment as shown in FIG. 1A, checking system 24A is comprised of a PPV server 31 which detects the validity of the event request code, and generates a password, which is applied to interface 27. Interface 27 generates in synthetically voiced language the numbers and/or characters of a password, which is reproduced acoustically in telephone 25 whereby it is provided to the subscriber which has keyed in the event request code.

Alternatively, the password can be applied to the aforenoted modem and passed directly into the subscriber terminal 5 for application to descrambler/converter 7 after being translated locally by a local modem and data receiver 37 into a signal recognizable by the descrambler/converter.

According to another embodiment, the table 33 is dispensed with. The encrypted event request code contains a check sum. By first determining that the check sum is correct for the event request code, and if correct, then decrypting the event request code, it is determined that a valid subscriber has requested an event. If the code will not decrypt, an invalid subscriber is indicated, or if the check sum is not correct, there has been an error, or tampering in transmission. In either case the event is denied.

If the code is decrypted, table 35 is accessed to determin whether a valid program has been selected. Alternatively, table 35 is not used, and an assumption is made that the validity of the program has been checked with the creation of the event request code at the subscriber terminal.

Assuming that it is the subscriber which has heard the password from telephone 25, he then applies the password to the subscriber terminal, e.g. by keying the password into his terminal remote control. The password is received in the data receiver 37, is translated into a signal recognizable by descrambler/converter 7, and applies it thereto. After it is received, the encrypting processor will reverse the process and decrypt the password. The result is compared with the original request code kept at the subscriber station for validation. When there is no conformity an invalid message appears on the screen.

If the password is accepted, this causes display of the desired program at the appropriate time and for the appropriate interval.

In order to control the validity of subscribers, the checking system includes an SMS 30 which contains a billing unit 39 (shown in more detail in FIG. 1). The billing unit can be a personal computer operated by a cable TV operator. Registered subscribers to the particular cable TV operator which have a good credit history or which have prepaid for certain programs are entered into the billing unit which stores the addresses of the terminals of such valid subscribers in table 33.

It should be noted that the billing unit 39 could be associated with a particular cable TV operator. The encryption key is broadcast to each subscriber in a data channel, then stored in memory 15 of subscriber terminal 5. It is preferably changed from head end 1 at predetermined intervals, e.g. bi-monthly, monthly, etc. The encryption code can be generated by billing unit 39 or by network supervision (not shown). It will be recognized that a single encryption key can be used for all subscribers authorized to receive programs and services from a single cable TV operator.

Different central stations 24 can be connected to head end 1, one associated with each cable operator. However all of the subscriber terminals can be connected to the same cable TV network medium 3. In order to separate the subscriber terminals associated with each cable TV operator, all of the subscriber terminals which are authorized to receive from a particular cable TV operator should have the same encryption key; different encryption keys are used by subscriber terminals authorized to receive from different cable TV operators.

As a result of the above, event request codes will not be recognized by the central stations 24 of cable TV operators related to subscriber terminals which are authorized to different cable TV operators. Thus plural cable TV operators can use the same network and can pool the transmission of free cable channels and services. Yet due to the different encryption keys, their pay per view customers can be kept totally separate. This allows complete security to various cable TV operators which may sign different service providers for their respective systems.

Figure 2:
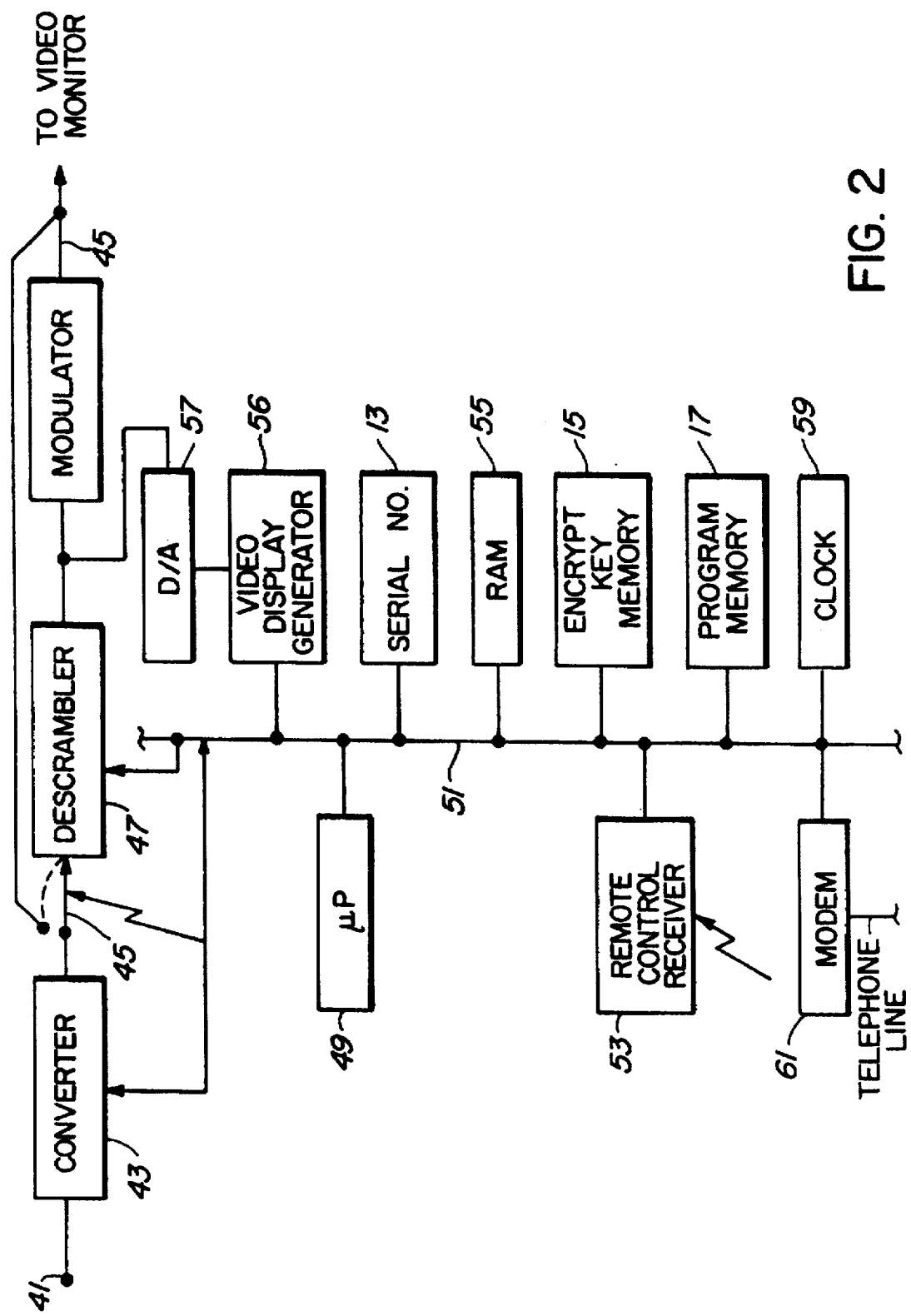
FIG. 2 is a block diagram of pertinent portions of the subscriber terminal.

Turning to FIG. 2, a more detailed view of a subscriber terminal 5 is shown.

An input 41 receives signals from the medium 3 and applies them to converter 43. Typically converter 43 converts the channel of the input signal to e.g. channel 3 for display on a video monitor. For normal signals, the output of converter 43 is passed through switch 45 to video output line 45 for application to a video input of a video monitor.

Switch 45 can alternatively apply the output of converter 43 to descrambler 47. Converter 43, switch 45 and descrambler 47 are controlled by microprocessor 49 via bus 51.

A remote controlled receiver 53 receives e.g. infrared signals from a remote control transmitter used by a subscriber, converts the signals to digital form, and applies them to bus 51 for reception by microprocessor 49. A random access memory RAM 55 stores programs for use by microprocessor 49 in carrying out the functions of the subscriber terminal. The microprocessor 49 can also access data stored in RAM 55 for display on video monitor 9, and after forming a display using a video display generator 56 applies the signal through digital to analog converter 57, where the signals are converted into a form that can be displayed by video monitor 9, which signals are modulated in modulator 58 and are applied to output line 45.

Normal operation of the above is described in U.S. Pat. No. 4,623,920 issued Nov. 18th, 1986, invented by Michel Dufresne et al, which is incorporated herein by reference.

A terminal address module 13 is connected to bus 51, whereby the microprocessor can access the serial number of the terminal. In addition, an encryption key memory 15 can store the aforenoted encryption key sent from the head end.

In addition, a RAM program memory 17 is connected to a bus 51 for access by microprocessor 49.

Programs on a barker channel, e.g. channel 14, are displayed by bypassing descrambler 47. Data transmitted on a data channel which can be in the vertical interval or line 21 of the barker channel is applied via converter 43 or is demodulated on a demodulator (not shown) to bus 51. This data can be e.g. the program identifier numbers associated with programs listed on the barker channel. Microprocessor 49 controls storing this data in program memory 17.

When the program list is viewed by a subscriber on the barker channel, he selects a program by inputting the displayed associated program code using e.g. his remote control. The program code is input by the remote control transmitter into the remote control receiver 53 (preferably prefixed by a special designator, such as *), where it is translated into data and is temporarily stored in RAM 55. Microprocessor 49 detects the program code, and using a program stored in RAM 55 determines the event code therefrom, e.g. digits which will become EEE referred to above. Microprocessor 49 then checks those digits with corresponding digits stored in program memory 17, and if valid accesses the encryption algorithm program stored in RAM 55.

Upon processing the encryption algorithm, microprocessor 49 accesses the serial number from module 13 and the selected program number, temporarily stored in RAM 55, and generates the preferably 14 digit event code. It formulates the event request code into displayable form using generator 56, adds some explanatory characters such as a confirmation advisory, an instruction to telephone a certain telephone number by accessing data stored in RAM 55, and applying the information thereto for display on the video monitor. The subscriber, seeing the event request code displayed on the monitor, dials the digits of the indicated telephone number and, as described above, receives a password from central station 24. The subscriber then keys the password into the terminal remote control which is received by the remote control receiver 53. The password is temporarily stored in RAM 55. Using a program stored therein, microprocessor 49 decodes the password into an enabling time, an enabling interval, a descrambling code and a channel control signal for descrambler 47.

It will be understood that a modem 61 can be connected to bus 51 and instead of the event request code being keyed into a telephone by the subscriber, the modem 61 under control of the microprocessor 49 can dial a modem at central station 24, can apply the event request code thereto automatically, and can receive the password therefrom, applying it to bus 51 for storage in RAM 55 and subsequent use thereof by microprocessor 49.

At the appropriate time indicated by clock 59, the microprocessor switches switch 45 to output the converter 43 into the input of descrambler 47, applies the stored descrambling code to descrambler 47 and switches a tuner contained in converter 43 to receive from a specific scrambled channel designated by the logical channel indicated in the password, and causes converter 43 to output the signal to the barker channel or to some other predetermined channel. The requested channel is thus converted, descrambled and is applied to output line 45 for display on the video monitor.

After the designated interval of the program, the microprocessor 49 removes the scrambling code 47, switches converter 43 back to the channel previously tuned to, and switches switch 45 to bypass descrambler 47, allowing the video monitor to display ordinary free channels.

It will be understood that memories described with reference to the embodiment of FIG. 2 can be combined in an efficient way if desired. Further, it is preferred that a backup battery should be used to preserve data stored therein in case of a power failure.

FIG. 3 is a block diagram illustrating a multi-operator network. Plural cable operator control systems 70A-70N each transmits programs via a common network 72 to its own set of subscribers, each of which is connected to the same common network. Each subscriber has a reception control subscriber terminal such as that described with reference to FIG. 2. Each receives signals from a main head end by wired link, microwave link 74 or other means of receiving signals. Each cable operator system has its own subscriber and program authorization and verification system comprised of SMS 30A-30N and server 31A-31N. Each program authorization and verification system has its own telephone number for the telephone line 25. Thus each cable operator system can provide subscriber terminal and encryption codes for its own group of subscribers, can provide its own program codes on its own barker channel, and can authorize its own subscribers to receive programs by providing its own passwords. It will also be recognized that the individual cable operators can contract with the head end operator to operate an SMS 30 and server 31 on its behalf. In order to ensure that the individual cable operators do not use interfering or overlapping codes, it is preferred that the operator of the head end should assign individual unique codes to each of the operator systems. The systems operate within the common network as described earlier. It should be noted that with each of the various terminals storing an unique common code that is specific to a particular cable operator system, even for non pay-per-view programming, the receipt of programs by each of the subscriber terminals can be restricted to those sent out by an associated cable operator system, since the code can control the descrambling of normal program signals which are transmitted with an unique scrambling code by each of the various operator systems. Other programs can be accepted from the head end 72 and are not scrambled by the cable operator systems, and are transmitted in common by all cable operator systems for general viewing by all subscribers without restriction. The network need not be a cable TV system, but may be any form of mass audience program distribution system which carries any form of signals for reception by a mass audience.

A person understanding this invention may now conceive of alternative structures and embodiments or variations of the above. All of those which fall within the scope of the claims appended hereto are considered to be part of the present invention.

We claim:

1. A cable TV system comprising:
   (a) a cable TV distribution network,
   (b) a plurality of cable TV broadcaster equipments adapted to transmit programming via said network destined for subscriber terminals authorized to receive only from individual broadcaster equipments,
   (c) a plurality of subscriber terminals connected to said network, each subscriber terminal including an encryption code, each code being unique to a particular broadcaster,
   (d) means at each said terminal for selecting a program, and for obtaining an encrypted event request code derived from the encryption key,
   (e) means at said equipments generating a password which is unique to an event and is unique to an individual particular broadcaster, and
   (f) means for applying the password to a terminal at which a program has been selected, for controlling display of a selected program at the terminal at which the program has been selected,
   whereby programs broadcast by other broadcasters are inhibited from being displayed at other terminals.

2. A cable TV system comprising a network, subscriber terminals connected to the network authorized to receive signals offered by specific ones of different operators, and means for restricting receipt by said subscribers of said signals to those offered by said specific ones of said operators for which said subscriber terminals have been authorized, said means for restricting being derived as a result of a determination of a subscriber terminal identity and a code unique to an operator.

3. A system as defined in claim 2 in which the restricting means is a descrambling code enabled by a password for descrambling said programs, the password provided by one specific operator for one specific terminal being ineffective for another specific terminal.

4. A system as defined in claim 3 in which said another specific terminal is one which has been authorized to receive signals by another specific operator.

5. A method of distributing signals to various subscribers comprising:
   (a) connecting plural subscriber terminals to a single program distribution network for receiving programs therefrom,
   (b) connecting plural program suppliers to said network,
   (c) downloading to said subscriber terminals a code respectively related to a preselected particular program supplier, and storing said code at related subscriber terminals,
   (d) transmitting programs from said program suppliers to the network in particular separate channels, and
   (e) automatically enabling the receipt of programs only from said preselected related program supplier by specific subscriber terminals using a corresponding one of said codes.

6. A method as defined in claim 5 including distributing said signals via an earth satellite transmitter.

7. A method as defined in claim 5 including distributing said signals via a local transmitter.

8. A method as defined in claim 5 including distributing said signals via a wide area optical fiber network.

9. A method of distributing signals to valid subscribers connected to a network to which a plurality of servers, each having a unique server code, are connected comprising requesting a program from a program supplies, providing said program on a pay-per-view server based on a program promotion code, supplying a password unique to a single terminal connected to the network and to said pay-per-view server, and applying the password to said terminal for enabling the selected program to operate, where by the password is derived as a result of a determination of said single terminal identity and of said server code.

10. A method as defined in claim 9 in which the password is also unique to said program.

11. A method of distributing signals to valid subscribers as defined in claim 9 comprising:
    (a) storing valid subscriber terminal identification codes at a central station,
    (b) broadcasting promotions of services available to subscribers, each associated with a specific promotion code,
    (c) selecting one of said services and entering a selected service promotion code into a terminal at a subscriber location,
    (d) automatically reading an identification number associated with said terminal in response to said entering of a selected promotion code,
    (e) processing said identification number and said selected promotion code and generating an event request code therefrom,
    (f) providing said event request code to a verification center,
    (g) at said verification center, processing said event request code, accessing said subscriber terminal identification codes, and providing a password unique to said terminal and said selected promotion code,
    (h) entering the password into the terminal at the subscriber location, and
    (i) providing access to a service utilizing one of said distributed signals corresponding to the selected promotion code to the subscriber in response to said entering of the password.

12. A method of distributing signals to valid subscribers as defined in claim 9 comprising:
    (a) at a subscriber terminal, generating a request code for a service utilizing said signals by accessing a program code relating to said service and an address code relating to an identification of said terminal, and processing said codes to generate a service request code,
    (b) requesting said service from a central terminal by providing said service request code,
    (c) at said central terminal processing said service request code and checking the validity of the address code and of the program code, and generating a password, (d) entering the password at the subscriber terminal, and in response providing access to signals providing said service.

13. A method as defined in claim 12 in which the program code is unique to a single server of said service.

14. A method as defined in claim 13 in which said service is the provision of a pay-per-view program signal.

15. A cable TV system comprising:
   (a) a cable TV distribution network,
   (b) a plurality of cable TV broadcaster equipments adapted to transmit programs via said network destined for subscriber terminals authorized to receive only from individual broadcaster equipments,
   (c) a plurality of subscriber terminals connected to said network, each subscriber terminal including a first code, each code being unique to a particular broadcaster,
   (d) means at each said terminal for selecting a program, and for obtaining an event request code derived from the first code,
   (e) means at said equipments generating a password which is unique to an event and is unique to an individual particular broadcaster, and
   (f) means for applying the password to a terminal at which a program has been selected, for controlling display of a selected program at the terminal at which the program has been selected, whereby programs broadcast by other broadcasters are inhibited from being displayed at other terminals.

16. A cable TV system as defined in claim 15 comprising:
   (a) subscriber terminals, each subscriber terminal including:
      (i) means for storing a terminal identification code,
      (ii) means for storing a program identification code,
      (iii) means for processing said codes and generating a program request code thereby,
      (iv) a display for displaying programs and for displaying said program request code,
      (v) means for receiving a password and in response, enabling a program to be passed to the display for display thereon,
   (b) a head end, and a CATV network connected thereto, for transmitting said program to said subscriberterminals,
   (c) a central station comprising:
      (i) means for receiving said program request code, and determining the program identification code and the terminal identification code therefrom,
      (iv) means for verifying validity of the determined program and terminal identification codes, and
      (v) means for generating said password in response to verification of the validity of the determined program and terminal identification codes.

* * * * *